Feb. 14, 1928.

T. G. HAMILTON 1,659,024

MIXING IMPLEMENT FOR PLASTERERS

Filed June 16, 1927     2 Sheets-Sheet 1

Feb. 14, 1928.

T. G. HAMILTON 1,659,024

MIXING IMPLEMENT FOR PLASTERERS

Filed June 16, 1927    2 Sheets-Sheet 2

Inventor
Thomas G. Hamilton
By: Williams, Bradbury,
McCaleb + Hinkle
Attys

Patented Feb. 14, 1928.

1,659,024

UNITED STATES PATENT OFFICE.

THOMAS G. HAMILTON, OF CHICAGO, ILLINOIS, ASSIGNOR OF ONE-THIRD TO IDA NEWBERG, OF CHICAGO, ILLINOIS.

MIXING IMPLEMENT FOR PLASTERERS.

Application filed June 16, 1927. Serial No. 199,205.

My invention relates to improvements in mixing implements for plasterers, more particularly to an implement for preparing the mixture of plaster and lime for the plastering of walls and the like.

An object of the invention is to provide an implement of the character described which embodies novel means for completely breaking up any lumps in the lime prior to the gaging of the mix, so that the lime is in proper condition for receiving the plaster during the work of mixing.

A further object of the invention is to provide an implement of the character described which by its novel construction simultaneously performs the double function of kneading the mass so as to cause sub-portions to move with respect to other portions and in separating the mass as sub-portions move, thus causing a thorough and uniform mixture of the plaster and lime.

A further object of the invention is to provide an implement which when inverted presents a relatively small group of its cutting bars to the mix at a point adjacent to the board, some of which contact with the board so as to pulverize smaller lumps in the mix by movement of the lumps between the bars and the board.

At the present time the process known as gaging is performed upon a board by the plasterer with a square implement known as the hock and the trowel. With these two implements the lime and plaster is mixed, the plaster and water being admitted to a depression formed at the center of the lime upon the board from which point it is worked into the lime. This process is exceedingly tiresome to the arm of the plasterer and consumes a relatively long time if the mix is thorough. In practice I have found that the present method usually produces a plaster which contains streaks of either lime or plaster, both of which are unsuited for the purpose intended and which often show through paint or calcimine finish.

My invention is illustrated in the accompanying drawings forming a part of said case, in which Fig. 1 is a perspective view showing my improved mixing implement in use;

Fig. 4 is a rear elevation of the construction illustrated in Fig. 2; and

Fig. 5 is a side elevation of the implement inverted as in one of its operative positions.

Figure 1:
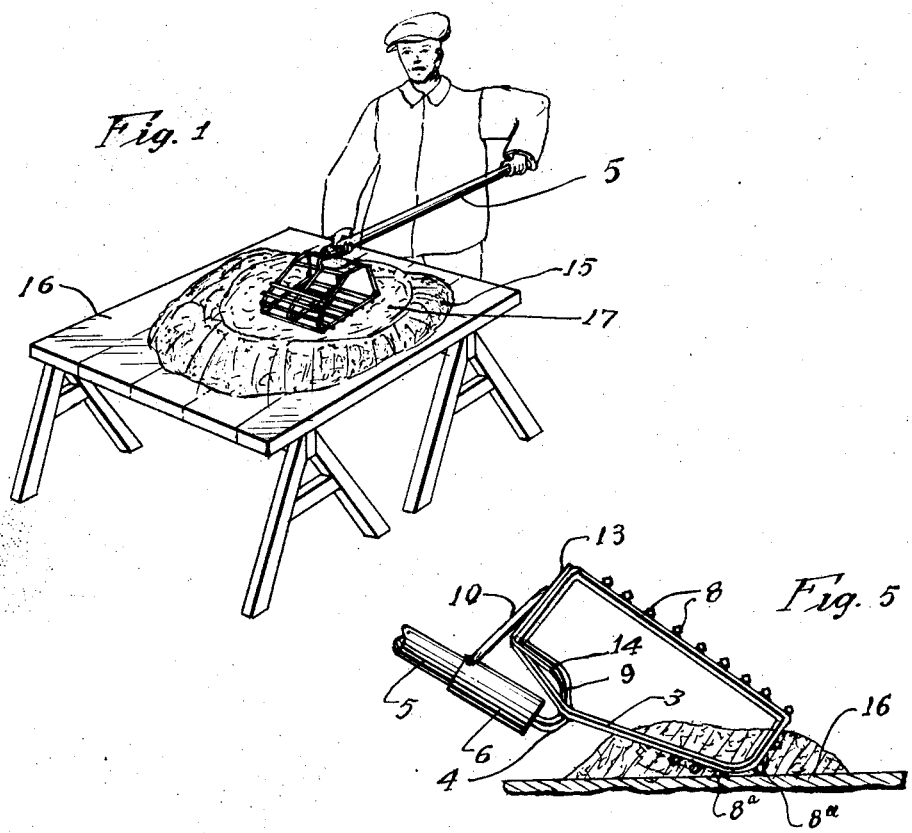

In carrying out my invention I make use of three loops of steel rod 1, 2, and 3, each of which is square in cross section. These loops are spaced apart from one another for a distance of substantially 6 inches. The end loops, 1 and 3, converging inwardly at their upper portions (see Fig. 2). The loop 2 has its ends bent as shown at 4 and projected within the base portion of a handle 5, about which a metallic sleeve 6 is disposed.

Figure 3:
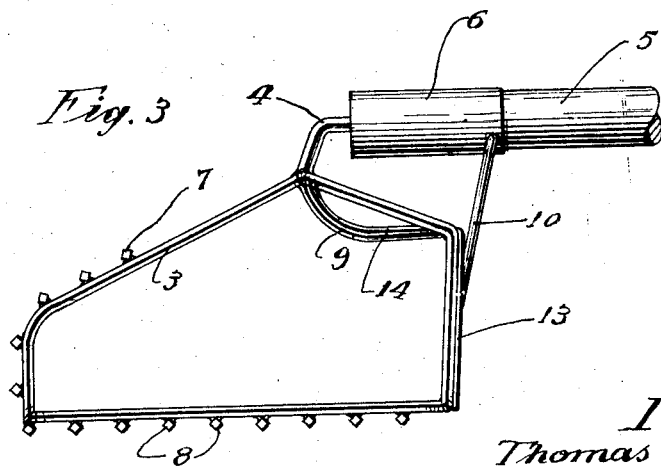
Fig. 3 is the side elevation of the structure illustrated in Fig. 2.

The upper portions of the loops 1 and 3 are secured to the loop 2 by transversely disposed rods 7. A plurality of parallel rods 8, square in cross section and spaced about 1 inch apart, are secured to the bottom, front and a portion of the top side of the loops 1, 2, and 3, as shown in Fig. 3. These rods are so disposed as to present the sharp corners thereof away from the loops. Thus downward movement of the implement brings the sharp edges of the lower bars 8 into contact with the mix and forward movement brings the bars at the front with their sharp edges in contact with the mix. The upper and rearward portion of the loop 2, as shown at 9, is curved downwardly so as to permit sufficient clearance about the sleeve 6 for the grasping thereof by the hand of the operator as shown in Fig. 1.

A pair of diagonal struts 10 are secured at 11 to the sleeve 6 and are fixed at their lower ends 12 by spot welding process to a gage plate 13. This gage plate 13 is of sheet steel and is secured to the outer rearward sides of the loops 1, 2 and 3.

Figure 2:
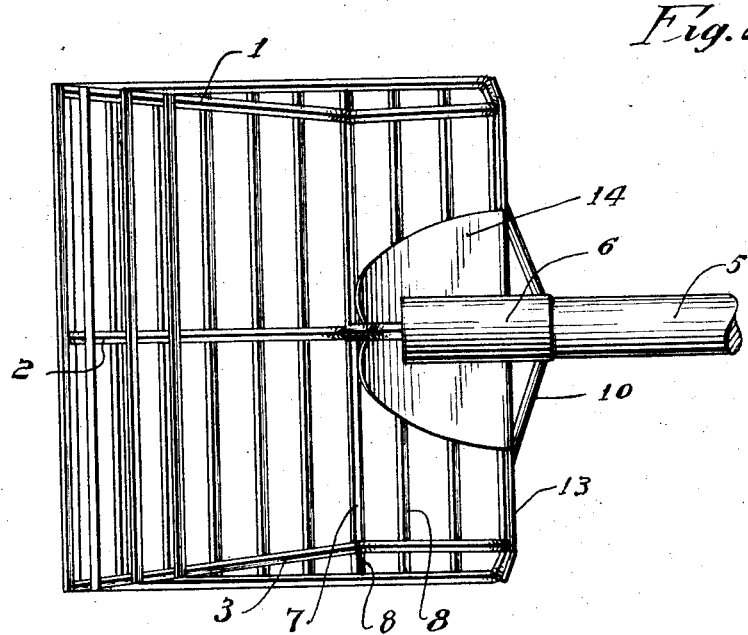
Fig. 2 is a top plan view of the implement.

A shield 14, formed integral with the gage plate 13 and having the contour illustrated in Fig. 2, is secured to the curved portion 9 of the loop 2. The purpose of the shield 14 is to prevent plaster from touching the hand of the operator as it grips the sleeve 6, particularly during that step in the operation wherein the implement is brought down upon the lime prior to gaging for the purpose of breaking the mass into sub-portions and breaking up large lumps of lime.

In use the plasterer first places lime 15 upon the elevated mortar board 16, which is at a height slightly lower than the operator's waist. He then grasps the implement, as shown in Fig. 1, and bears directly down thereupon so as to move the bars 8 down through the mass. This operation is repeated until any lumps of lime in the mass are reduced to finer consistency, after which a depression is made in the center of the lime and water and plaster 17 poured therein. The mix is now ready for that process known as gaging. This is done by moving the implement downwardly and transversely across the board so that as the bars 8 descend, the gage plate 13 moves sub-portions of the mass laterally. The result of this cutting up of the mass by the bars as the sub-portions roll over or move with respect to adjacent portions is the practical elimination of all lumps as well as thorough mixing of the plaster and lime.

This gaging operation is repeated until the entire mass appears uniform in consistency. The tool is then inverted, as shown at Fig. 5, so that two of the bars, as shown at 8ᵃ, engage with the board 16, and the tool is worked forwardly and back, which process causes the pulverizing of any small pieces of lime which might lie close to the board, as well as an additional and finer co-mingling of the elements.

While I have illustrated and described a specific embodiment of my invention, many modifications may be made without departing from the spirit of the invention, and I do not wish to be limited to the precise details set forth but desire to avail myself of all changes within the scope of the appended claims.

Having thus described my invention, what I claim as new and desire to secure by Letters Patent of the United States is:

1. A mixing implement of the character described, comprising a body frame, a plurality of spaced-apart parallel rods carried by the body, a substantially flat gage plate carried at the rear of the body, and a handle for the implement, said rods and said gage plate lying in planes transverse to the axis of the handle.

2. A mixing implement of the character described, comprising an open body frame, a plurality of spaced-apart metal rods carried by the bottom and front of said frame, a gage plate extending in a plane substantially transverse to the bottom of said frame, and a handle for said body frame.

3. A mixing implement of the character described, comprising a body frame, a plurality of spaced apart parallel rods angular in cross section carried by the bottom, front and a portion of the top of said frame and having corners throughout their lengths facing outwardly from the frame, and a handle for said frame having its axis transverse to the axes of said rods.

In witness whereof, I hereunto subscribe my name this 14th day of June, 1927.

THOMAS G. HAMILTON.